United States Patent
Huang

(10) Patent No.: US 12,497,972 B2
(45) Date of Patent: Dec. 16, 2025

(54) FAN BRAKE CIRCUIT

(71) Applicant: ASIA VITAL COMPONENTS CO., LTD., New Taipei (TW)

(72) Inventor: Po-Sheng Huang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 143 days.

(21) Appl. No.: 18/515,534

(22) Filed: Nov. 21, 2023

(65) Prior Publication Data
US 2025/0163926 A1  May 22, 2025

(51) Int. Cl.
*H02P 6/24* (2006.01)
*F04D 27/00* (2006.01)
*H02P 3/12* (2006.01)

(52) U.S. Cl.
CPC ............ *F04D 27/008* (2013.01); *H02P 3/12* (2013.01)

(58) Field of Classification Search
CPC ............ F04D 27/008; H02P 3/12; H02P 6/24
See application file for complete search history.

(56) References Cited

U.S. PATENT DOCUMENTS

| | | |
|---|---|---|
| 4,710,686 A | 12/1987 | Guzik |
| 6,066,930 A | 5/2000 | Horiguchi et al. |
| 7,852,023 B2 | 12/2010 | Kifuku et al. |
| 9,998,038 B1 * | 6/2018 | Zhang ........................ H02P 3/22 |
| 2004/0075408 A1 | 4/2004 | Gorti et al. |
| 2010/0066279 A1 | 3/2010 | Frankel et al. |
| 2016/0149521 A1 * | 5/2016 | Huang ........................ H02P 3/12 318/379 |
| 2021/0399660 A1 * | 12/2021 | Huang ........................ H02P 6/24 |
| 2022/0069743 A1 * | 3/2022 | Huang ........................ H02P 3/10 |

FOREIGN PATENT DOCUMENTS

TW          I289001 B          10/2007

OTHER PUBLICATIONS

Search Report dated Dec. 18, 2024 issued by Taiwan Intellectual Property Office for counterpart application No. 112143303.

* cited by examiner

*Primary Examiner* — Muhammad S Islam
(74) *Attorney, Agent, or Firm* — Demian K. Jackson; Jackson IPG PLLC

(57) ABSTRACT

A fan brake circuit includes a control module, a motor driving module electrically connected to the control module and a motor, and a brake control module including an energy storage unit, a stored energy supply control unit electrically connected to the energy storage unit and an input power supply, and a brake unit electrically connected to the stored energy supply control unit and the motor. When the fan is power off, the stored energy supply control unit controls the energy storage unit to output an operating voltage to the brake unit, which then transmits a brake signal to the motor for braking the fan quickly (or immediately) at the time of power off. The brake action ends once the fan stopped, but the fan is still rotatable by airflows produced by another fan as a result of windmill effect to keep providing a certain degree of cooling effect.

5 Claims, 3 Drawing Sheets

FAN BRAKE CIRCUIT

FIELD OF THE INVENTION

The present invention relate to a fan brake circuit, and more particularly, to a fan brake circuit that can quick brake a power-off fan and does not affect the heat removing (cooling) function of a fan in a fault condition.

BACKGROUND OF THE INVENTION

A fan is a main heat dissipation tool for many consumption products. When a system is overheated, the fan(s) provided with the system would be actuated to lower the overall system temperature to achieve the purpose of cooling the system. When the system temperature has lowered to a specific temperature value, the fan(s) would stop operating.

Conventionally, to avoid the entire system from overheating and burning down, heat dissipation fans are usually mounted in the system to dissipate heat automatically. However, in response to the large amount of heat produced by the elements having increasingly high computing speed, the fans also have to rotate at a very high speed. In this case, the fan, even if it is in a power-off state, would keep operating for a while due to inertia before it completely stops.

The currently available fan brake techniques can be divided into two types, namely, fan power-on brake and fan power-off brake. According to the fan power-on brake technique, a control unit (i.e. a micro controller, MCU) outputs a digital signal, such as a PWM (pulse-width modulation) signal, to control two fan motor driving lower arm metal-oxide-semiconductor field-effect transistor (MOSFET transistor) switches to a normally open position, so that the motor rotor could not normally produce a magnetic field that is correctly corresponding to a magnetic stripe. A resistance is produced between the non-magnetic field rotor and the magnetic field of the magnetic stripe to achieve a brake effect. According to the fan power-off brake technique, a discrete transistor/capacitor and a lower arm MOSFET switch together form a brake triggering electronic circuit (i.e. a brake circuit), which is electrically connected to a motor-end power source to realize a braking mechanism when the fan is powered off; or alternatively, fan blades that are brought to rotate due to the windmill effect feed back a voltage and accordingly, trigger the brake circuit to brake, so that the fan being rotated by the windmill effect would not be brought to rotate in a reverse direction at a high speed, allowing the fan blades to stop rotating eventually. Please refer to FIG. 1, which is a waveform graph of actually measured data of the input power supply, the voltage across motor coil, and the fan electric current of a conventional fan in a power-off state. In the waveform graph, V indicates the waveform of the input power supply, arrow $V_{up}$ indicates the input power supply is on, and arrow $V_{down}$ indicates the input power supply is off; M indicates the waveform of the voltage across the motor coil, and the downward inclined line in the frame $M_{off}$ in the motor coil voltage waveform M indicates the fan motor is still operating (that is, the fan blades are still rotating) and keeps producing a CEMF or back EMF (counter/back electromotive force) voltage; and F indicates the waveform of the fan current. According to the waveform graph of actually measured data as shown in FIG. 1, the conventional fan without a brake mechanism would keep rotating inertially for a period of time before it completely stops.

In the current fan power-off brake technique, the brake circuit accomplishes the brake mechanism by connecting it to the motor end voltage. This type of brake mechanism might not be advantageously applied to a dual-rotor fan or a serial fan, which includes a pre fan and a post fan. When one of the pre fan and the post fan is failed, airflows produced by the functionally normal fan would bring the failed fan to rotate as the windmill effect. When the failed fan rotates due to the windmill effect, the brake circuit would be triggered by a back EMF feedback voltage to operate and brake the failed fan and accordingly, produce a brake resistance. At this point, the rotational speed of the failed fan blades is suppressed and the reduction of the rotational speed further forms a resistance against the airflows. In this condition, the failed fan, says the pre fan in a serial fan, would block the in-coming airflows of the serial fan; or when the failed fan is the post fan of the serial fan, the failed fan would block the airflows from flowing out of the serial fan. Therefore, with the conventional power-off brake mechanism, when one single fan, such as the pre fan or the post fan, is failed, it would be continuously braked to suppress its rotational speed and therefore block the airflows produced by the other normal fan. As a result, the serial fan with one failed fan could no longer keep providing the cooling effect.

It is therefore tried by the inventor to solve the problem in the conventional dual-rotor fan and the serial fan, so that when one of the fans in the dual-rotor fan or the serial fan is failed, the failed fan can still keep its brake mechanism and keep rotating due to the windmill effect without producing a resistance force, allowing the failed fan to keep providing a certain degree of cooling effect.

SUMMARY OF THE INVENTION

To effectively solve the above problem, a primary object of the present invention is to provide a fan brake circuit, which enables a fan to brake quickly (immediately) when the fan is power off and enables a failed fan to maintain a certain degree of cooling effect due to a windmill effect.

To achieve the above and other objects, the fan brake circuit according to the present invention includes a control module, a motor driving module, and a brake control module. The control module is electrically connected to an input power supply. The motor driving module is electrically connected to the control module, the brake control module and a motor. The brake control module includes an energy storage unit, a stored energy supply control unit, and a brake unit. The energy storage unit receives the input power supply and stores the latter as an operating voltage. The stored energy supply control unit is electrically connected to the energy storage unit, the input power supply and the brake unit, and controls the energy storage unit to output or not to output the operating voltage to the brake unit according to whether the input power supply is on or off. The brake unit generates a brake signal to the motor according to the operating voltage output from the energy storage unit, so that the motor forms a short-circuit loop and is braked. Therefore, when the fan is power off, the stored energy supply control unit controls the energy storage unit to output the operating voltage to the brake unit, so that the motor receiving the brake signal transmitted from the brake unit can brake quickly to stop the fan from operating.

The fan brake circuit according to the present invention can achieve the effect of quick brake of the fan at the time of power off, and the brake action ends once the fan is braked. However, the fan is rotatable by airflows produced by another fan as a result of windmill effect and can therefore still keep some degree of cooling effect.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention provides a fan brake circuit 1, which will now be described with some embodiments thereof.

Figure 1:
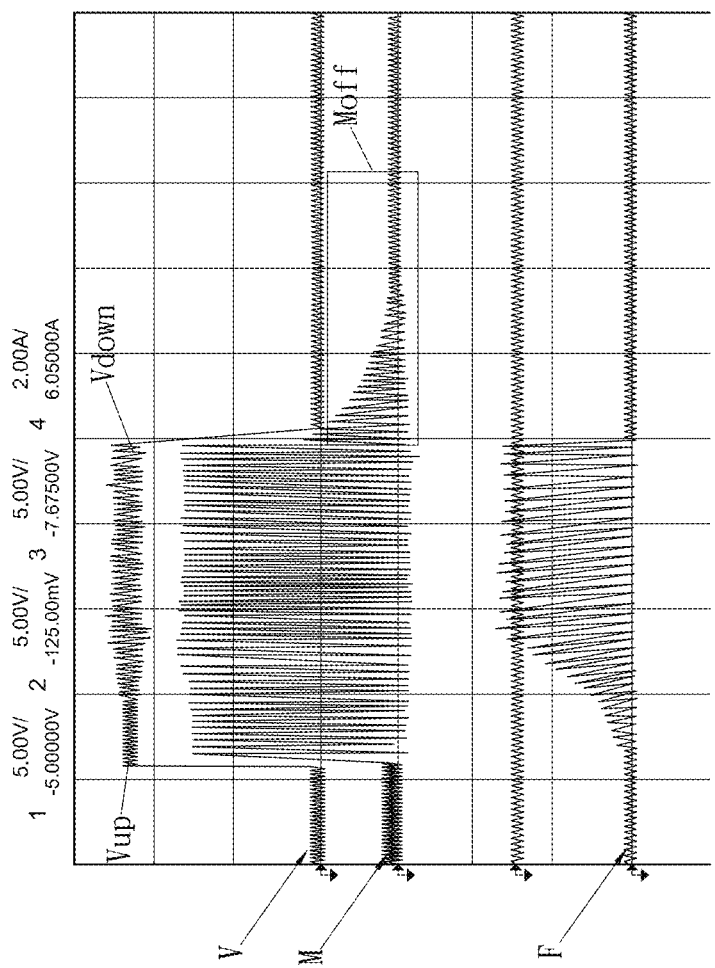
FIG. 1 is a waveform graph of actually measured data of the input power supply, the voltage across the motor coil, and the fan current of a conventional normal fan when the fan is power off and does not have a braking function.
Figure 2A:
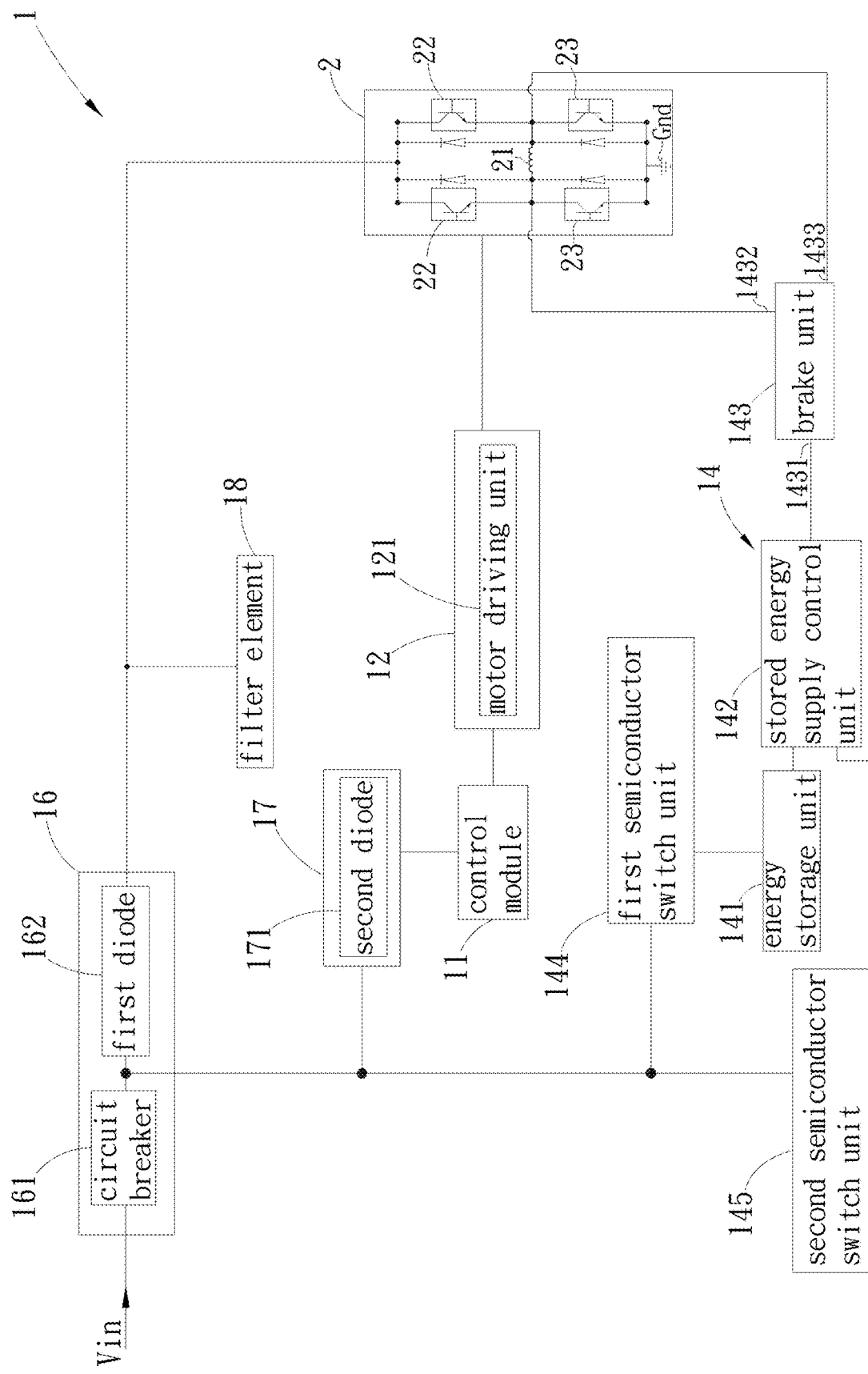
FIG. 2A is a block diagram of a fan brake circuit according to a preferred embodiment of the present invention.

Please refer to FIG. 2A. The fan brake circuit 1 is for use on a fan (not shown). The fan has a motor 2, which is non-restrictively described as a single-phase brushless motor in a preferred embodiment of the present invention. In practical implementation of the present invention, the fan motor 2 can be otherwise a three-phase or a multi-phase brushless motor. For a three-phase brushless motor, there are three motor coils 21; for an n-phase brushless motor, the number of the motor coils 21 is n, and so on.

The fan brake circuit 1 includes a control module 11, a motor driving module 12, and a brake control module 14. The control module 11 is a central processing unit (CPU) or a micro control unit (MCU) or a digital signal processor (DSP). The control module 11 is electrically connected to an input power supply $V_{in}$ and the motor driving module 12. The control module 11 has a plurality of pins, including a power pin, an output pin, an input pin, or other pins for different functions. Among others, the output pin is used to output a plurality of control signals, such as a pulse-width modulation (PWM) signal, for controlling the motor driving module 12 and the motor 2.

In the preferred embodiment, the control module 11 and the input power supply $V_{in}$ further has a first protection unit 16 and a second protection 17 provided between them. The first protection unit 16 includes a circuit breaker 161 and a first diode 162. The circuit breaker 161 can be a fuse, for example. An end of the circuit breaker 161 is electrically connected to the input power supply $V_{in}$. When the fan operates normally, the circuit breaker 161 allows the input power supply $V_{in}$ to flow therethrough. On the other hand, when the fan is in an abnormal state, such as overloaded or line fault, the circuit breaker would interrupt the current flow to protect the fan from damage. The first diode 162 has an anode side electrically connected to another end of the circuit breaker 161 and a cathode side electrically connected to a filter element 18, such as a capacitor, and the motor 2. The second protection unit 17 includes a second diode 171, which has an anode side electrically connected to the anode side of the first diode 162 and a cathode side electrically connected to one of the pins (i.e. a power supply pin) on the control module 11.

The motor driving module 12 is electrically connected to the motor 2 and includes a plurality of driving units 121, from each of which a driving signal is output to the motor 2. In the preferred embodiment, two driving units 121 are included. Each of the driving units 121 includes a plurality of resistance elements and at least one transistor, such as an NMOS (n-type-metal-oxide-semiconductor) transistor. Specifically, the driving units 121 respectively have an end electrically connected to the control module 11 and another end electrically connected to the motor 2.

As shown in FIG. 2A, the motor 2 includes a plurality of upper arm switch units 22 and a plurality of lower arm switch units 23 and a motor coil 21. In the non-restrictively illustrated preferred embodiment, there are two upper arm PMOS (p-type metal-oxide-semiconductor) transistor switches and two lower arm NMOS transistor switches. Specifically, the upper arm switch units 22 respectively have an end electrically connected to the input power supply $V_{in}$ and another end electrically connected to an end of the lower arm switch unit 23, the motor coil 21, and a brake unit 143 in the brake control module 14. The lower arm switch units 23 are respectively connected at another end to a ground Gnd. The driving units 121 are respectively electrically connected at another end to the upper arm switch units 22 or the lower arm switch units 23, so that the driving units 121 output driving signals to the upper arm switch units 22 or the lower arm switch units 23 and drive the motor 2 to operate. Further, the number of the driving units 121 and the upper and lower arm switch units 22, 23 is changeable or adjustable according to the number of motor phases. For example, in the case of a three-phase motor 2, there should be three driving units 121, three upper arm switch units 22, and three lower arm switch units 23.

The brake control module 14 includes an energy storage unit 141, a stored energy supply control unit 142, and a brake unit 143. The energy storage unit 141 includes at least one resistance element and at least one capacitor element for receiving an input voltage and storing the same as an operating voltage. Specifically, a user may set the operating voltage value to be gotten after power interruption via adjusting a capacitance value of the capacitor elements of the energy storage unit 141 and adjusting a resistance value of the resistance elements of the energy storage unit 141. Further, the energy storage unit 141 and the input power supply $V_{in}$ have a first semiconductor switch unit 144 provided between them. The first semiconductor switch unit 144 is a diode element for preventing the operating voltage stored therein from flowing in an opposite direction back to the input power supply $V_{in}$ and being released. Specifically, the first semiconductor switch unit 144 has two ends electrically connected to another end of the circuit breaker 161 and to the energy storage unit 141, respectively, such that only the input power supply $V_{in}$ is directly input to the energy storage unit 141 without being influenced by other circuits.

The stored energy supply control unit 142 is electrically connected to the energy storage unit 141, the input power supply $V_{in}$, and the brake unit 143. Further, there is a second semiconductor switch unit 145 provided between the stored energy supply control unit 142 and the input power supply $V_{in}$. The second semiconductor switch unit 145 is a diode element having two ends electrically connected to the stored energy supply control unit 142 and the other end of the circuit breaker 161, respectively. The stored energy supply control unit 142 controls the energy storage unit 141 to output or not to output the operating voltage thereof according to whether the input power supply $V_{in}$ is in a power-on or a power-off state. That is, the stored energy supply control unit 142 knows the input power supply $V_{in}$ is currently in the power-on state when it receives the input power supply $V_{in}$ that passes through the second semiconductor switch unit 145. On the other hand, the stored energy supply control unit 142 knows the input power supply $V_{in}$ is currently in the power-out state when it does not receive any input power supply $V_{in}$ that passes through the second semiconductor switch unit 145. Therefore, when the fan is on, the stored energy supply control unit 142 controls a switch element, which can be a metal-oxide-semiconductor field-effect transistor (MOSFET transistor) provided in the stored energy supply control unit 142 and is connected to the energy storage unit 141, to pull down its voltage level, such that the switch element in the stored energy supply control unit 142 is open, ensuring the energy storage unit 141 does not output the operating voltage to the brake unit 143. On the other hand, when the fan is off, the stored energy supply control unit 142 controls the switch element therein to stop pulling down the voltage, so that the switch element in the stored energy supply control unit 142 is closed, allowing the energy storage unit 141 to output its operating voltage to the brake unit 143

The brake unit 143 is electrically connected to the motor 2 and has a first end 1431, a second end 1432, and a third end 1433. The first end 1431 of the brake unit 143 is electrically connected to the stored energy supply control unit 142, the second end 1432 and the third end 1433 of the brake unit 143 are electrically connected to the other end of the upper arm switch units 22 and two ends of the motor coil 21, respectively. Specifically, the brake unit 143 internally includes a plurality of independent MOS transistor switches, which are configured as two upper bridge switches (or two lower bridge switches) for short-circuiting the motor coil 21. Further, the brake unit 143 can connect its internal MOS transistor switches according to the operating voltage output from the energy storage unit 141 and generates a brake signal to the motor 2, so that the internal MOS transistor switches of the brake unit 143 and the motor coil 21 of the motor 2 form a short-circuit loop to achieve the effect of braking the motor 2 quickly (instantly).

Figure 2B:
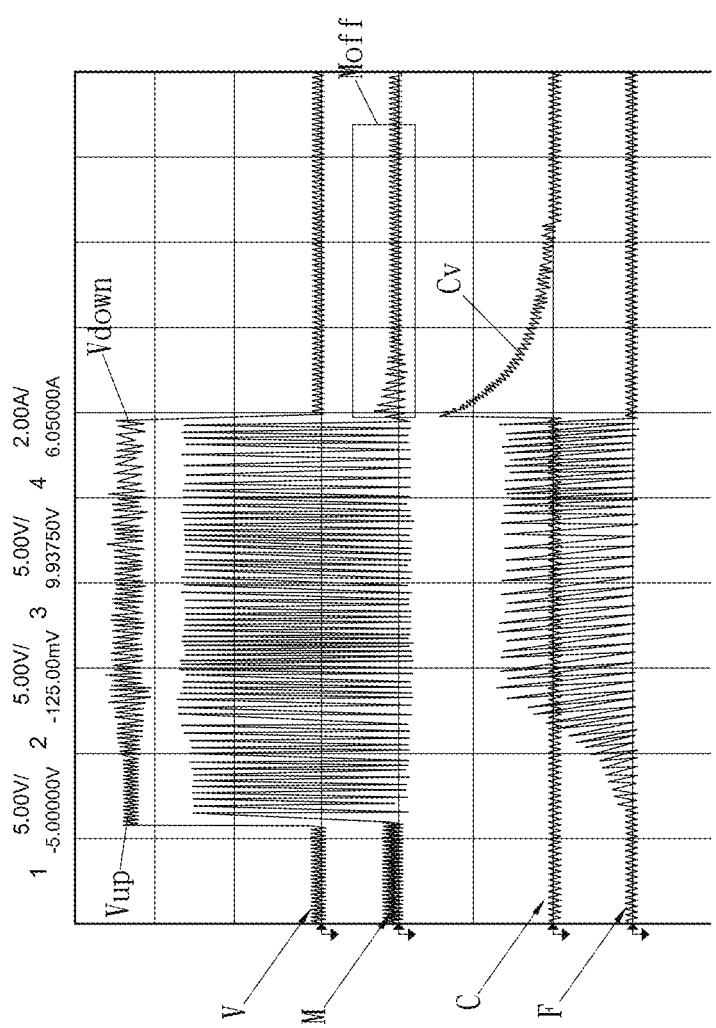
FIG. 2B is a waveform graph of actually measured data of input power supply, operating voltage in energy storage unit, the voltage across motor coil, and fan current of the fan brake circuit of the preferred embodiment of the present invention when the fan is power off and braked.

Thus, when the fan is on, the input power supply $V_{in}$ is supplied to the motor 2, the control module 11, the energy storage unit 141, and the stored energy supply control unit 142, enabling the control module 11 to control the driving units 121 normally to output a driving signal to the fan motor 2 for the same to operate. At this point, according to the fact that the input power supply $V_{in}$ is on, the stored energy supply control unit 142 controls the energy storage unit 141 not to output operating voltage to the brake unit 143, such that the brake unit 143 does not generate the brake signal to the motor 2. On the other, when the fan is turned off, the input power supply $V_{in}$ does not supply power to the motor 2, the control unit 11, the energy storage unit 141 and the stored energy supply control unit 142. At this point, according to the fact that the input power supply $V_{in}$ is cut off, the stored energy supply control unit 142 controls the energy storage unit 141 to release the stored operating voltage to the brake unit 143, so that the brake unit 143 generates the brake signal to the motor 2 according to the operating voltage output from the energy storage unit 141 and a short-circuit loop is formed on the motor coil 21 of the motor 2 to achieve the effect of quick (instant) brake. When the first brake action causes the fan blades to brake quickly, the brake action is ended and the fan is not in a continuous brake condition. In this manner, no brake resistance will occur on the fan. Thereafter, the fan blades are brought by external airflows to move naturally as a windmill effect and accordingly, the fan keeps providing its cooling function. Please refer to FIG. 2B, which is a waveform graph of actually measured data of the input power supply $V_{in}$, the operating voltage of the energy storage unit 141, the voltage across the motor coil 21, and the fan current. In the graph of FIG. 2B, V is the waveform of the input power supply $V_{in}$, C is the waveform of the operating voltage in the energy storage unit, M is the waveform of the voltage across the motor coil 21, and F is the waveform of the fan current. In the waveform V of the input power supply $V_{in}$, arrow $V_{up}$ indicates the input power supply $V_{in}$ is on (i.e. the input power supply is supplied to the fan) and arrow $V_{down}$ indicates the input power supply $V_{in}$ is off (i.e. the input power supply is not supplied to the fan). In the waveform C of the operating voltage, arrow $C_v$ indicates that, when the fan is power off, the energy storage unit 141 releases stored operating voltage $V_c$ to the brake unit 143 to brake quickly. In the waveform M of the voltage across the motor coil 21, the smooth horizontal line in the frame $M_{off}$ indicates the fan motor brakes and stops quickly (i.e. the fan blades are braked instantly and become completely still soon) and has not any counter-electromotive force voltage. As can be seen from the actually measured waveforms shown in FIG. 2B, the present invention can indeed achieve the effect of quick fan brake and accordingly, can effectively avoid the problem that an operator is unexpectedly hit by the fan blades.

In another embodiment, the control module 11 further includes an enable unit (not shown), which is electrically connected to the stored energy supply control unit 142. When the input power supply $V_{in}$ is on, the enable unit outputs an enable voltage to the stored energy supply control unit 142, so that the stored energy supply control unit 142 controls the energy storage unit 141 not to output the operating voltage. The enable voltage is used to assists the stored energy supply control unit 142 in controlling the energy storage unit 141 not to output the operating voltage to the brake unit 143. When the fan is on, the enable unit synchronously outputs the enable voltage to the stored energy supply control unit 142, so that the stored energy supply control unit 142 controls the energy storage unit 141 not to output the operating voltage to the brake unit 143, in order to effectively avoid false operation or abnormality of the stored energy supply control unit 142 and achieve mistake proofing. On the other hand, when the fan is off, the enable unit is cut off synchronously and does not output the enable voltage to the stored energy supply control unit 142.

The energy storage unit 141 and the input power supply $V_{in}$ further have a third semiconductor switch unit (not shown) provided between them. The third semiconductor switch unit is a diode element for preventing the operating voltage stored in the energy storage unit 141 from flowing in an opposite direction to the input power supply $V_{in}$ and being released. Specifically, the third semiconductor switch unit has an end electrically connected to the filter element 18 and a cathodic side of the first diode 162, and another end electrically connected to the energy storage unit 141. When the fan is off, the brake unit 143 causes the motor 2 to short-circuit and brake quickly. Meanwhile, the fan would be driven by external airflows to rotate and generate a counter electromotive force manifesting as a voltage, which will flow through the third semiconductor switch unit to the energy storage unit 141 and be transmitted to the brake unit 143 to suppress the rotation of the fan blades. In practical implementation of the present invention, a user may determine whether to add or omit the third semiconductor switch unit to or from the fan brake circuit of the present invention according to that whether the fan design in a system (i.e. a single fan or a serial fan) needs to maintain the windmill effect at the time of power off. In the case the windmill effect is to be maintained, the third semiconductor switch unit is omitted. On the other hand, in the case the fan blade rotation after quick brake is to be suppressed, the third semiconductor switch unit can be included in the fan brake circuit.

In an alternative embodiment, which is similar to the above described preferred embodiments in circuit structure, elements and the way of element connection but the motor driving module 12 further includes a switch isolation unit (not shown) and a level pull-up unit (not shown). The switch isolation unit is electrically connected to the other ends of the driving units 121, the second and third ends 1432, 1433 of the brake unit 143, and the lower arm switch units 23 of the motor 2 to provide the function of isolating the fan brake circuit from the power supply. When the input power supply $V_{in}$ is stopped (i.e. the fan is off), the switch isolation unit prevents the operating voltage in the energy storage unit 141 from being released via the pin on the control module 11 to the ground (Gnd) and becoming zero volt quickly, so as to effectively avoid the condition of losing the brake function. The level pull-up unit is electrically connected to the switch isolation unit and has the function of pulling up the voltage level of the brake signal generated by the brake unit 143 to a higher level when the input power supply $V_{in}$ is stopped. This facilitates rear-end lower arm switch units 23 to form an on-state and let the motor coil 21 form a short-circuit loop to thereby achieve quick brake. In practical implementation of the present invention, it is also possible to omit the MOS transistor switches provided in the third semiconductor switch unit and/or the brake unit and let the brake unit 143 use the lower arm switch units 23 (or the upper arm switch units 22) of the motor 2. In this case, the brake unit 143 outputs the brake signal to the lower arm switch units 23 of the motor 2 to form a closed circuit, and the lower arm switch units 23 and the motor coil 21 of the motor 2 form a short-circuit loop to achieve quick brake of the fan.

The fan brake circuit 1 designed according to the present invention can be applied to a single fan, a dual-rotor fan, or a serial fan (e.g. consisting of a pre fan and a post fan connected in series) to achieve the quick brake effect. When the fan brake circuit of the present invention is applied to the dual-rotor fan and the serial fan, it not only provides the effect of quickly braking the fan at the time of power off, but also enables the blades of a failed fan (such as a pre fan or a post fan) in the dual-rotor fan or the serial fan to keep normal without generating any resistance force and be brought by airflows produced by the other normal fan to rotate in a natural manner as a result of windmill effect. With the fan brake circuit of the present invention, the fan may have reduced flow resistance in a system (such as a server system), so that the flow field in the system is smooth enough to keep the system in a certain degree of cooling state when the fan is failed. Further, since the brake control module 14 is powered mainly by the external input power supply $V_{in}$, the operating voltage in the energy storage unit 141 can make quick response to the input power supply $V_{in}$. That is, the energy storage unit 141 can output the stored operating voltage to the brake unit 143 as soon as the input power supply $V_{in}$ is off, enabling the brake unit 143 to respond immediately and enable the brake mechanism to brake the motor 2 and achieve the effect of quick brake at the time of power off.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A fan brake circuit comprising:
   a control module electrically connected to an input power supply;
   a motor driving module electrically connected to the control module and a motor; and
   a brake control module including:
      an energy storage unit for receiving the input power supply and storing the input power supply as an operating voltage;
      a stored energy supply control unit electrically connected to the energy storage unit and the input power supply for controlling the energy storage unit to output or not to output the operating voltage according to whether the input power supply is on or off; and
      a brake unit electrically connected to the stored energy supply control unit and the motor; and the brake unit generating a brake signal to the motor according to the operating voltage output from the energy storage unit, so that the motor forms a short-circuit loop and is braked; and wherein, when the fan is power off, the stored energy supply control unit controls the energy storage unit to output the operating voltage to the brake unit, and the motor brakes according to the brake signal transmitted from the brake unit.

2. The fan brake circuit as claimed in claim 1, wherein the stored energy supply control unit controls the energy storage not to output the operating voltage to the brake unit when the fan is power on, so that the brake unit does not generate the brake signal to the motor.

3. The fan brake circuit as claimed in claim 1, wherein the motor driving module includes a plurality of driving units; the driving units respectively having an end electrically connected to the control module and another end electrically connected to the motor.

4. The fan brake circuit as claimed in claim 3, wherein the motor includes a plurality of upper arm switch units and a plurality of lower arm switch units and a motor coil; the upper arm switch units respectively being electrically connected at an end to the input power supply and electrically connected at another end to an end of one of the lower arm switch units, the motor coils, and the brake unit; the lower arm switch units respectively being electrically connected at another end to a ground; and the motor driving units respectively being electrically connected at another end to the upper arm switch units or the lower arm switch units.

5. The fan brake circuit as claimed in claim 1, wherein the control module is selected from a group consisting of a central processing unit, a micro controller, and a digital signal processor.

\* \* \* \* \*